(12) United States Patent
Luo et al.

(10) Patent No.: US 8,581,920 B2
(45) Date of Patent: Nov. 12, 2013

(54) UTILIZING MASKED DATA BITS DURING ACCESSES TO A MEMORY

(75) Inventors: Lei Luo, Durham, NC (US); Frederick A. Ware, Los Altos Hill, CA (US); John Wilson, Raleigh, NC (US); Jade M. Kizer, Durham, NC (US)

(73) Assignee: Rambus Inc., Sunnyvale, CA (US)

( * ) Notice: Subject to any disclaimer, the term of this patent is extended or adjusted under 35 U.S.C. 154(b) by 1429 days.

(21) Appl. No.: 12/210,104

(22) Filed: Sep. 12, 2008

(65) Prior Publication Data

US 2009/0089557 A1 Apr. 2, 2009

Related U.S. Application Data

(60) Provisional application No. 60/975,703, filed on Sep. 27, 2007.

(51) Int. Cl.
*G09G 5/37* (2006.01)
*G06T 1/60* (2006.01)

(52) U.S. Cl.
USPC .......................... 345/563; 345/530; 345/561

(58) Field of Classification Search
USPC .......................................... 345/530, 561, 563
See application file for complete search history.

(56) References Cited

U.S. PATENT DOCUMENTS

| | | | |
|---|---|---|---|
| 4,906,867 A * | 3/1990 | Petty | 326/27 |
| 5,949,796 A * | 9/1999 | Kumar | 370/529 |
| 6,788,222 B2 * | 9/2004 | Hall et al. | 341/50 |
| 7,139,852 B2 | 11/2006 | LaBerge | |
| 7,197,669 B2 * | 3/2007 | Kong et al. | 714/39 |
| 7,321,240 B2 * | 1/2008 | Schaefer | 326/82 |
| 7,428,689 B2 * | 9/2008 | Wallner et al. | 714/763 |
| 7,684,258 B2 * | 3/2010 | Kanda et al. | 365/189.03 |
| 2007/0101073 A1 * | 5/2007 | Macri et al. | 711/154 |
| 2007/0242508 A1 | 10/2007 | Bae | |

OTHER PUBLICATIONS

"Preliminary Publication of JEDEC Semiconductor Memory Standard", GDDR4 SGRAM Data Strobe Functionality, Feb. 2005, Item #1600.24.
Micron Designline vol. 11, Issue 4, 4Q02, "The Future of Memory: Graphics DDR3 SDRAM Functionality", pp. 1-9.
Micron Designline vol. 12, Issue 1, 1Q03/2Q03, "Graphics DDR3 On-Die Termination and Thermal Considerations", pp. 1-8.
Micron Technology, "Graphics DDR3 DRAM", 256Mb: x32 GDDR3 DRAM, www.micron.com/datasheets, downloaded Jan. 12, 2009.
Samsung Electronics, Rev 1.2(Sep. 2005), "512Mbit GDDR3 SDRAM", K4J52324QC-B, 512M GDDR3 SDRAM.

* cited by examiner

*Primary Examiner* — Joni Richer
(74) *Attorney, Agent, or Firm* — Fenwick & West LLP

(57) ABSTRACT

Embodiments of an apparatus that uses unused masked data bits during an access to a memory are described. This apparatus includes a selection circuit, which selects data bits to be driven on data lines during the access to the memory. This selection circuit includes a control input that receives a data mask signal, which indicates whether a set of data bits is to be masked during the access to the memory. During the access to the memory, the selection circuit selects either the set of data bits to be driven when the data mask signal is not asserted, or an alternative set of values to be driven when the data mask signal is asserted.

26 Claims, 10 Drawing Sheets

UTILIZING MASKED DATA BITS DURING ACCESSES TO A MEMORY

RELATED APPLICATION

This application hereby claims priority under 35 U.S.C. §119 to U.S. Provisional Patent Application No. 60/975,703, filed on 27 Sep. 2007, entitled "Utilizing Masked Data Bits During Accesses to a Memory", by inventors Lei Luo, Frederick A. Ware, John Wilson and Jade M. Kizer. The present application hereby incorporates by reference the above-referenced provisional patent application.

FIELD

The present embodiments generally relate to systems that make use of graphics memory. More specifically, the present embodiments relate to a method and an apparatus that uses unused masked data bits for various purposes during accesses to graphics memory.

DETAILED DESCRIPTION

Figure 1:
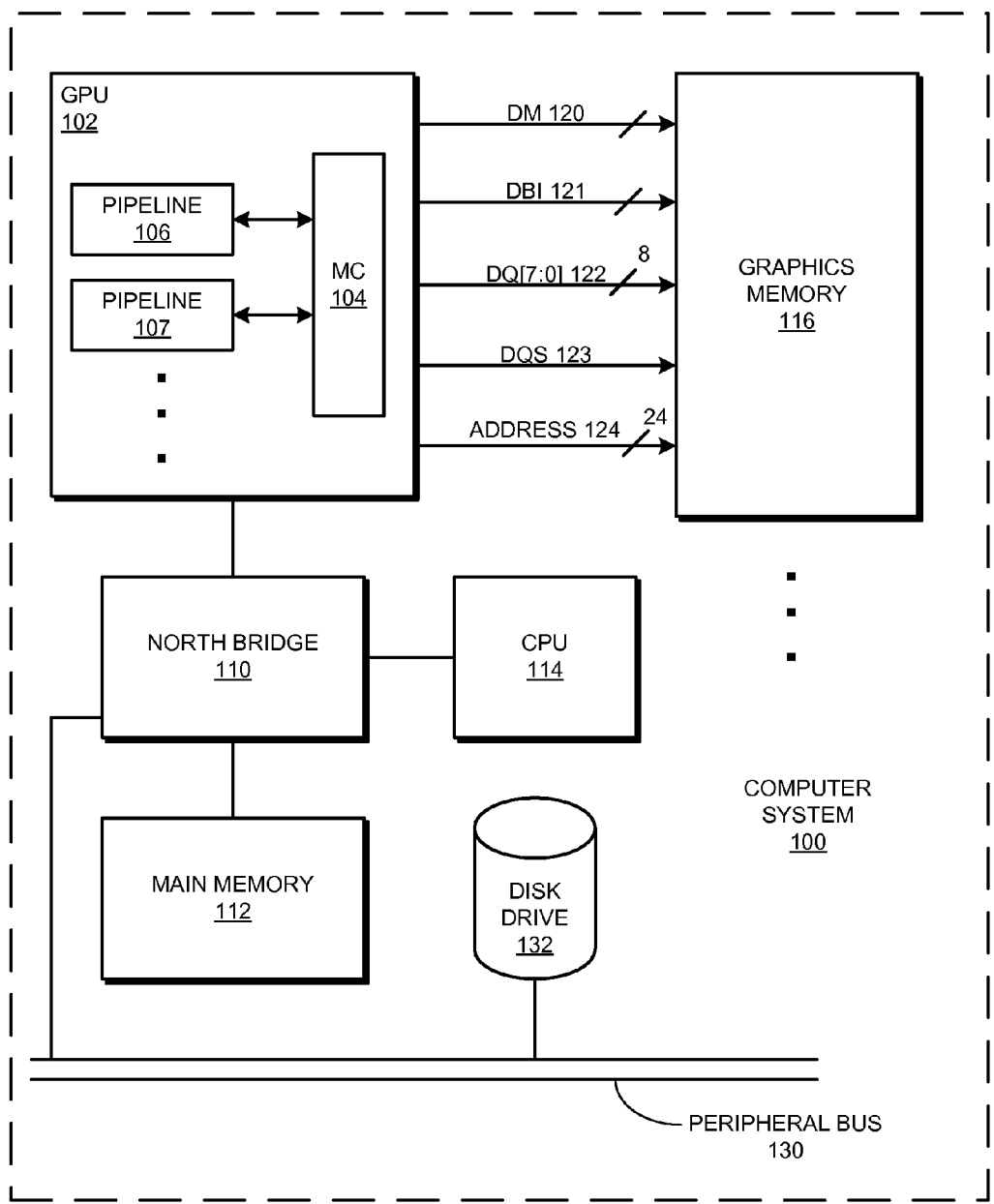
FIG. 1 illustrates an embodiment of a computer system.

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

Embodiments of a system, an integrated circuit that includes the system, and techniques for communicating signals between components in a computer system are described.

In some embodiments, the system includes a graphics controller which uses unused masked data bits during write operations to a graphics memory. More specifically, these embodiments include a selection circuit which selects data bits to be driven on data lines from the graphics controller to the graphics memory during write operations. This selection circuit includes a control input that receives a data mask signal that indicates whether a set of data bits is to be masked during write operations. During a given write operation to the graphics memory, the selection circuit selects either: (1) the set of data bits to be driven when the data mask signal is not asserted, or (2) an alternative set of values when the data mask signal is asserted.

In some embodiments, the alternative set of values includes values which substantially minimize an amount of power consumed while driving the corresponding data lines. For example, the values which substantially minimize the amount of power can be high-voltage values for data lines having Pseudo-Open-Drain-Logic (PODL) terminations (for example, as are defined in the Graphics-Double-Data-Rate 3 (GDDR3) and GDDR4 standards), or alternatively, voltage values which were previously transmitted for unterminated data lines, such as series-source terminated data lines. In such unterminated data lines, there is no termination at the receiver side, and the system terminates the reflected wave front returning to the driver in the series impedance of the driver. For these types of data lines, the previous bit is driven in place of masked bits to reduce power consumption because these types of data lines consume the most power while switching data values.

In some embodiments, the alternative set of values includes values which limit the number of simultaneously switching outputs between a data word which contains the set of data bits and a preceding data word.

In some embodiments, the alternative set of values includes values which limit a change in current consumption. For example, in a system with PODL terminations, the system can limit the number of high-voltage values that are driven in a data word (or a set of data words) that contains the set of data bits, as compared to a preceding data word (or a preceding set of data words).

In some embodiments, the alternative set of values includes values which communicate calibration information between the graphics controller and the graphics memory.

In some embodiments, the alternative set of values includes values that communicate side-band data between the graphics controller and the graphics memory.

In some embodiments, the graphics controller further comprises an alternative-value-generation circuit which generates alternative values to be driven on data lines based on the values of mask bits and also bits in the current data word containing the set of data bits and/or one or more preceding data words.

Other embodiments provide a method for transmitting signals. During this method, the system examines a data mask signal to determine whether a set of data bits is to be masked during an access to the graphics memory. If so, the system drives different values in place of the masked set of data bits on the corresponding data lines during the access to the graphics memory.

In some embodiments of the method, the access to the graphics memory is a write operation, and the method is performed at a graphics controller while the graphics controller is writing a data word containing the set of data bits to the graphics memory.

Although the aforementioned embodiments are described in the context of a graphics controller and a graphics memory, in general the aforementioned embodiments may be used in any situation where data bits are masked during an access to any type of memory. For example, the aforementioned embodiments may be used while communicating data values between a general-purpose processor and a main memory if such data values are masked during the communications.

Furthermore, the aforementioned embodiments may be used in any type of computer system or computing device, including: a desktop or laptop computer, a hand-held or portable computing device (such as personal digital assistants and/or cellular telephones), a set-top box, a home network, and/or a video-game device.

We now describe embodiments of circuits and devices as well as systems that include these circuits or devices, and communication techniques for use in these systems.

Computer System

FIG. 1 presents a block diagram of an embodiment of a computer system 100. Computer system 100 can generally include any type of computer system or computing device, including, but not limited to, a computer system associated with: a microprocessor, a mainframe computer, a digital signal processor, a portable computing device, a gaming system, a personal organizer, a cell phone, a device controller, or a computational engine within an appliance.

As is illustrated in FIG. 1, computer system 100 includes a central processing unit (CPU) 114, which can generally include any type of computational engine, such as a microprocessor or a device controller.

CPU 114 communicates with a main memory 112 through north bridge 110. Main memory 112 can generally include any type of random access memory which stores code and data for CPU 114. North bridge 110 can include any type of core logic unit which couples together components of a computer system.

CPU 114 also communicates with a disk drive 132 (or some other type of non-volatile storage) through north bridge 110 and peripheral bus 130. Note that peripheral bus 130 can also support other types of peripheral devices.

CPU 114 additionally communicates with graphics-processing unit (GPU) 102 through north bridge 110. GPU 102 can generally include any type of attached processor or computational circuitry which performs graphics-processing operations for computer system 100.

GPU 102 includes a number of execution pipelines 106-107, which periodically generate requests to access graphics memory 116 through memory controller (MC) 104. MC 104 can include any type of memory controller, which facilitates memory accesses, such as read and write operations, to graphics memory 116. Moreover, graphics memory 116 can include any type of memory which is dedicated to graphics-processing operations performed by a dedicated special-purpose graphics processor, or alternatively, a general-purpose processor.

Note that graphics memory 116 typically includes a number of memory devices, although only a single memory device is illustrated in FIG. 1. For example, graphics memory 116 can include 8 or 16 memory modules, each of which communicates with MC 104 through 8 data lines.

Note that MC 104 communicates with graphics memory 116 through lines which carry a number of types of signals, including data-mask (DM) signals 120, a dynamic-bus-inversion (DBI) signal 121, data (DQ) signals 122, a data-strobe (DQS) signal 123 and address signals 124.

DQ signals 122 communicate data values which are read from or written to graphics memory 116 during read and write operations, respectively. DQS signal 123 is a corresponding strobe signal for the data values. Moreover, address signals 124 specify addresses in graphics memory 116 to which the read and write operations are directed.

DBI signal 121 is used to dynamically switch the polarity of DQ signals 122 as needed to limit the number of data lines which simultaneously switch during successive memory operations. (This involves a switch-limiting technique which is commonly referred to as "dynamic bus inversion" or DBI.)

Data-mask signal 120 indicates whether or not a corresponding set of data bits on DQ signals 122 is to be masked during a memory operation. For example, if DM signal 120 is asserted during a write operation, the corresponding DQ signals 122 are not written to graphics memory 116 during the write operation. In this case, the lines that carry DQ signals 122 are unused during the write operation and can be used for other purposes, which are described in more detail below with reference to FIGS. 2-5.

Note that computer system 100 only illustrates signals for a write operation. For the sake of clarity, it does not illustrate corresponding signals for a read operation because data mask signals are generally not available to regulate data transmissions in the read direction, and the selection circuitry needed to manipulate masked data bits would be expensive to incorporate into memory devices. However, in cases where data mask signals are available for read data, it is possible to perform similar manipulations on masked data bits for read data, which is transferred from memory devices to a memory controller.

Circuit for Saving Signaling Power

During a write operation to the graphics memory, data which is being written to the graphics memory is often masked. In this case, the power used to signal this masked data is wasted. This problem can be alleviated by ensuring that masked bits do not use signaling power.

Figure 2A:
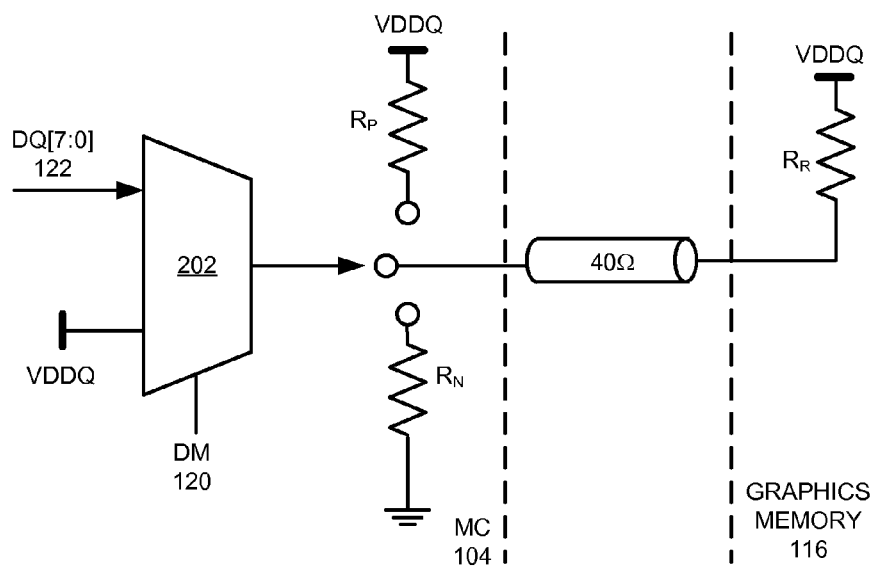
FIG. 2A illustrates an embodiment of a circuit with a Pseudo-Open-Drain-Logic (PODL) termination which can save signaling power.

For example, FIG. 2A illustrates an embodiment of a system which saves signaling power. Note that FIG. 2A illustrates circuitry that transmits data within MC 104 as well as circuitry that receives data within graphics memory 116. FIG. 2A also illustrates a selection circuit 202, which for example can be implemented as a multiplexer. More specifically, selection circuit 202 within MC 104 makes a selection between DQ signals 122 and high voltage signals VDDQ based on the value of DM signal 120.

The selected signals are then driven from MC 104 in GPU 102 (FIG. 1) to graphics memory 116 across a number of signal lines, which are illustrated as having a 40Ω impedance. Note that during operation of the pseudo-open-drain driver illustrated in FIG. 2A, transmitting a low-voltage value consumes more power than transmitting a high-voltage value because transmitting a low-voltage value creates a conducting path between VDDQ and Ground through $R_R$ and $R_N$.

The circuit illustrated in FIG. 2A conserves power by first determining whether DM signal 120 is asserted during a write operation, which means the corresponding bits DQ[7:0] 122 will not be written to during the write operation, and hence do not need to be transmitted to graphics memory 116. If so, the circuit saves power by selecting high-voltage values VDDQ to be transmitted from GPU 102 (FIG. 1) to graphics memory 116.

Figure 2B:
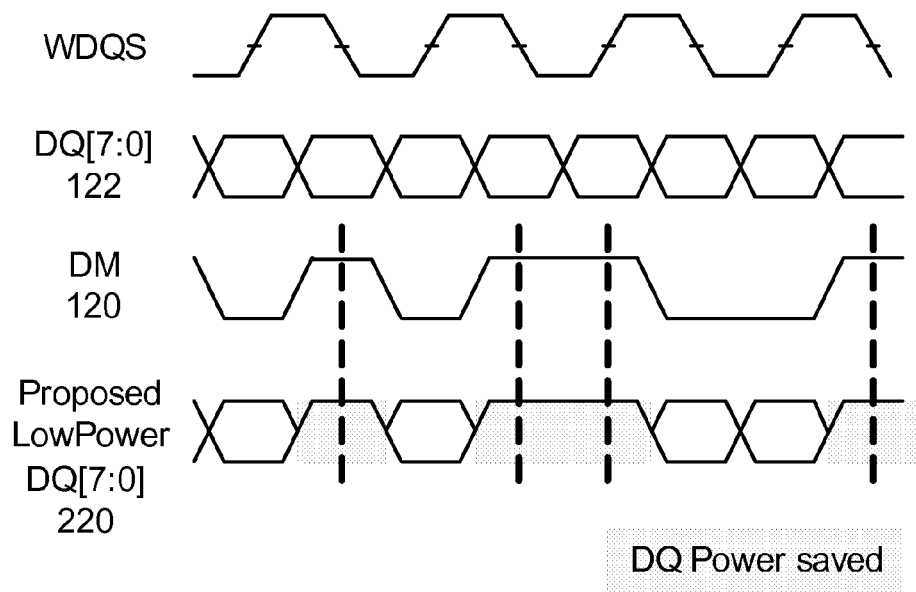
FIG. 2B presents a wave-form diagram illustrating the performance of an embodiment of a circuit which saves signaling power.

FIG. 2B presents a waveform diagram illustrating the performance of an embodiment of the circuit illustrated in FIG. 2A. The top waveform in FIG. 2B illustrates a strobe signal DQS for write operations. Note that write operations occur on both rising and falling edges of DQS. The second waveform from the top in FIG. 2B illustrates signals DQ[7:0] 122, which can have high- or low-voltage values depending upon what data values are being transmitted. The third waveform from the top of FIG. 2B illustrates a data mask signal 120 which is asserted on a high-voltage value. Finally, the bottom waveform in FIG. 2B illustrates proposed lower-power signals DQ[7:0] 220. Note that DQ[7:0] 220 are held to high-voltage values when the DM signal is asserted.

The above-described technique can significantly save on signaling power. For example, in FIG. 2B, 50% of the data to be written is masked. Hence, the system can save about 50% of the signaling power used during the write operations.

Note that the above-described embodiment is very simple to implement because it requires only simple changes at the graphics controller, not at the graphics memory. Hence, the above-described embodiment can be used with existing graphics memory chips. Furthermore, these simple changes do not require any additional pins or lanes between the graphics controller and the graphics memory.

Moreover, the simple changes at the graphics controller will not significantly affect system performance because the extra latency introduced by the selection circuit can be effectively hidden by pipelining consecutive write operations. Additionally, the latency of write operations generally has less effect on system performance than the latency of read operations.

The present embodiments are not meant to be limited to the types of terminations illustrated in FIG. 2A. In general, the present embodiments can include systems that use other types of terminations. For example, in some embodiments, the signal lines may be unterminated at the receiver in graphics memory 116. In these embodiments, the system conserves power by transmitting a previously transmitted value so that the corresponding signal line does not have to switch. Note that in a system with an unterminated receiver, switching a transmitted-voltage value consumes more power than transmitting the same voltage value.

Circuit for Reducing SSO

Simultaneously switching output (SSO) noise is a significant source of noise in a graphics memory system, and it can significantly limit the voltage and timing margin at receiver input, thereby limiting data rate. The embodiments described below provide an efficient and low-cost method for reducing mid-to-low frequency SSO noise. These embodiments operate by limiting fluctuations in the number of high-voltage values which are transmitted on the signal lines. A number of attributes of graphics memory systems, such as GDDR4, make this possible. First, as discussed above, for certain signaling techniques employed in GDDR systems, sending a high-voltage value does not consume steady-state power, while sending a low-voltage value does. This asymmetric power consumption makes it possible to control the steady-state power by toggling masked DQ bits. Second, in GDDR systems, there exist a significant number of masked DQ bits which can be toggled to control the overall SSO. Third, empirical analysis shows the critical SSO-related problems are due to the mid-to-low frequency SSO, which can be controlled by toggling the masked DQ bits.

Figure 3:
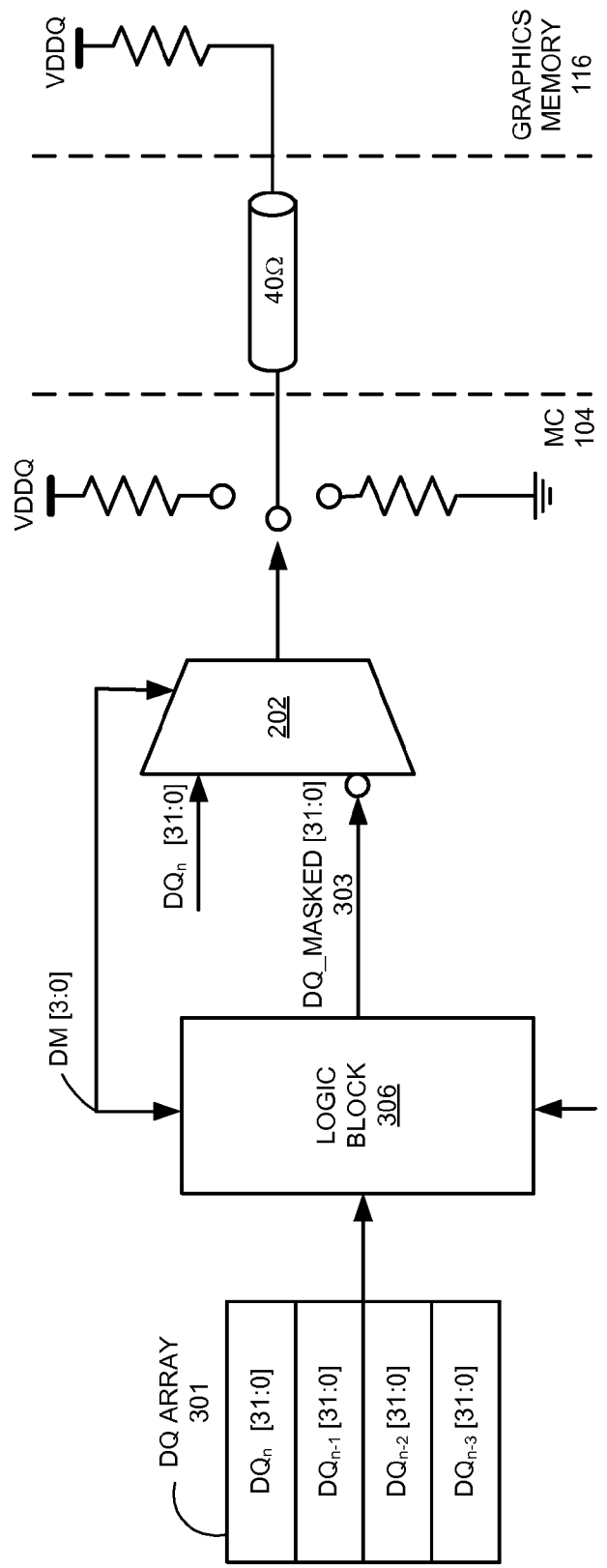
FIG. 3 illustrates an embodiment of a circuit which reduces simultaneously switching output (SSO) noise.

More specifically, FIG. 3 illustrates an embodiment of a circuit which can reduce simultaneously switching outputs (SSO). This circuit operates in the same way as the circuit illustrated in FIG. 2A, except that instead of driving VDDQ on masked data lines to save power, the circuit drives DQ-masked[31:0] signals 303 on the data lines, wherein the DQ-masked[31:0] signals 303 are generated by logic block 306.

More specifically, in the embodiment illustrated in FIG. 3, logic block 306 takes in four DM signals DM[3:0], which are each associated with one of the four bytes of data in the 32 data signals DQ[31:0]. Logic block 306 also takes in one or more control inputs 304, and takes in DQ bits from a DQ array 301, wherein DQ array 301 includes the current DQ values as well as a number of previously transmitted DQ values. For example, in the embodiment illustrated in FIG. 3, DQ array 301 includes a set of current DQ values $DQ_n[31:0]$ and three previously transmitted sets of DQ values, $DQ_{n-1}[31:0]$, $DQ_{n-2}[31:0]$ and $DQ_{n-3}[31:0]$.

Logic block 306 then generates a number of DQ-masked [31:0] signals 303 which can be used for a number of purposes, such as reducing SSO. Note that logic block 306 can generally include any type of combinational or sequential logic circuit, and hence can include a number of memory elements and combinational logic elements.

In one embodiment, to reduce high-frequency SSO, logic block 306 simply outputs values that were previously transmitted for the preceding data word on the corresponding data lines. In this way, the masked bits will not "switch" when they are transmitted, which will reduce SSO noise.

In another embodiment, to reduce mid-to-low-frequency SSO noise, logic block 306 effectively functions as a high-pass filter (HPF). In doing so, logic block 306 counts the number of high-voltage and/or low-voltage values in the current data word (and possibly in a preceding set of data words), and generates values for masked data bits which limit fluctuations in the number of high-voltage and/or low-voltage values. Unlike limiting the number of bits that switch, this embodiment effectively limits changes in the DC power used to drive the data bits, which can greatly reduce potential power-network resonance problems.

Figure 4:
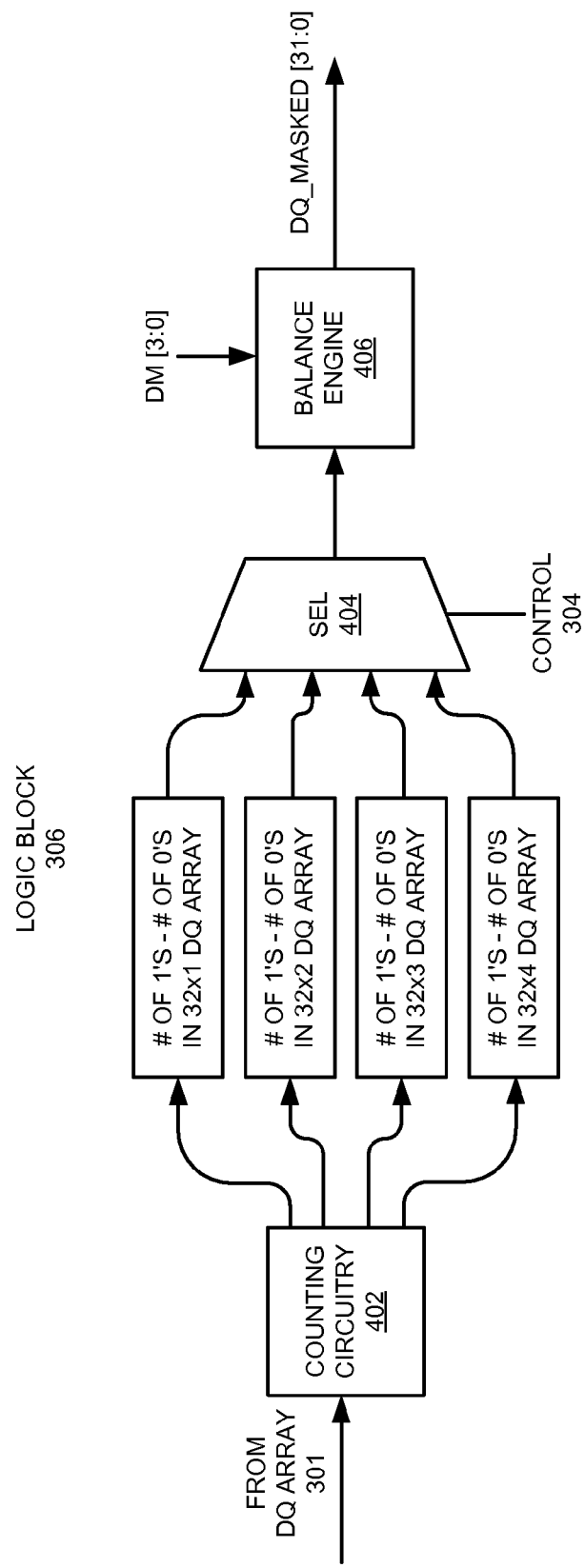
FIG. 4 illustrates an embodiment of a portion of the circuit illustrated in FIG. 3.

For example, FIG. 4 illustrates an implementation of logic block 306 which functions as a high-pass filter (HPF). In this embodiment, logic block 306 feeds the inputs from DQ array 301 into counting circuitry 402, which counts the number of 1's and 0's in selected subsets of data words in DQ array 301. (Note that this type of counting circuitry is well known in the art and can be implemented, for example, using carry-save adders.)

Counting circuitry 402 produces a number of values including: (1) the number of ones minus the number of zeros in the most-current word in DQ array 301; (2) the number of ones minus the number of zeros in the most-current two words in DQ array 301; (3) the number of ones minus the number of zeros in the most-current three words in DQ array 301; and (3) the number of ones minus the number of zeros in the all four words in DQ array 301.

These values feed into selection circuit 404, which selects one of the four values based on the value of control inputs 304. This enables logic block 306 to selectively consider the balance between ones and zeros in a set of one, two, three or four consecutive data words.

The selected value feeds into balance engine 406, which assigns DQ_masked[31:0] bits when corresponding data mask bits DM[i]=1, (i=3:0), so that the difference between the number of ones and zeros is minimized in the considered set of DQ data words.

In one embodiment, balance engine 406 determines whether the number of high-voltage values exceeds a target number of high-voltage values. If so, balance engine 406 causes more low-voltage values to be transmitted on the DQ-masked lines. On the other hand, if the number of high-voltage values is close to the target number of high-voltage values, balance engine 406 does not change the number of high-voltage values. Finally, if the number of high-voltage values is less than the target number of high-voltage values, balance engine 406 causes more high-voltage values to be transmitted.

Note that counting the number of high-voltage values in a set of data words can involve performing population counts on each data word and then adding together population counts for a preceding set of data words to obtain an aggregate population count for the set of data words.

Note that the circuitry illustrated in FIG. 3 adjusts data values at a byte level of granularity. However, in general, the system can adjust data values at smaller or larger granularities. For example, individual bits can be manipulated or 32 bits at a time can be manipulated.

Figure 9:
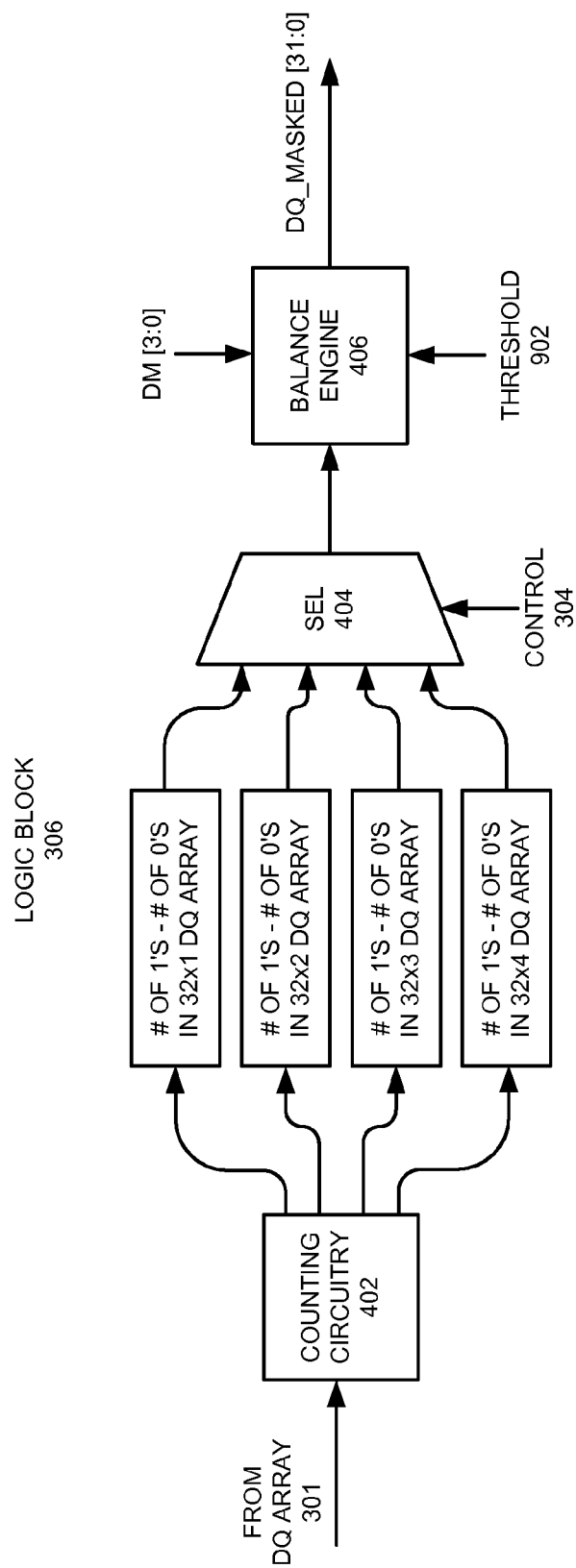
FIG. 9 illustrates an implementation that saves signaling power and reduces SSO at the same time.

Also, the balancing can be done across different data widths, such as a single byte, a single data word, or a parallel set of data words. As mentioned above, the balancing can also take place across a set of previously transmitted data words to ensure, for example, that the last four data words collectively have a certain ratio of high-voltage values. A low-power implementation of the SSO reducing circuit, is shown in FIG. 9. In this implementation, instead of minimizing the difference between the number of ones and zeros in the considered set of DQ data words, a threshold can be set to save signaling power. This threshold allows an arbitrary value to be chosen as the balancing value, instead of 50% for the average of ones or zeros. For example, the threshold could be set to 75% so that over a set of DQ data words the number of ones would occupy 75% of the values and the number of zeros would occupy 25% of the values (i.e., a threshold of 75% means that there are 3 ones to each zero). This method would use less power than a 50% threshold setting and would also provide a reduction in the SSO. Hence, balance engine 406 will be triggered if the number of ones exceeds the threshold, when compared to the number of zeros. Otherwise, balance engine 406 uses a preset value as DQ_MASKED [31:0], for example a balanced preset value which has 16 ones and 16 zeros.

Circuit for Transmitting Side-Band Data

In some embodiments, the system uses the unused masked data bits as a "side-band channel" to transmit information from the graphics controller to the graphics memory. For example, the graphics controller can use the unused masked data bits to transmit a bit pattern used for calibration purposes to the graphics memory instead of transmitting the calibration pattern in a separate transmission from the graphics controller to the graphics memory. This can potentially reduce the overhead involved in communicating the calibration bit pattern from the graphics controller to the graphics memory.

Process

Figure 5:
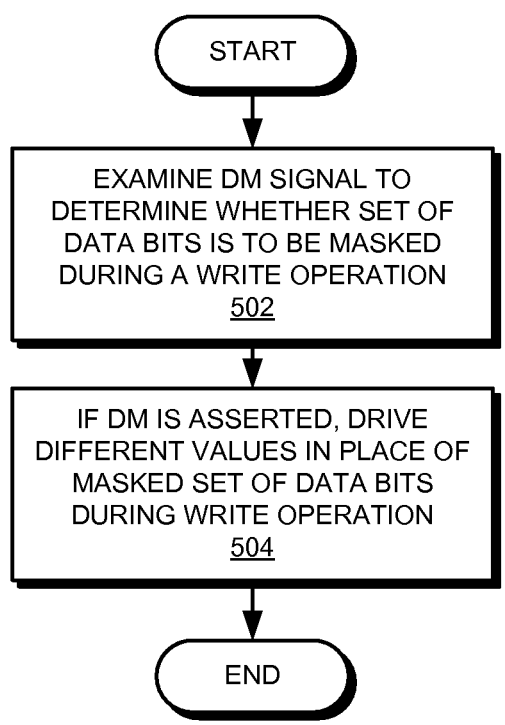
FIG. 5 presents a flow chart illustrating an embodiment of a process which drives different values in place of masked data bits.

In summary, FIG. 5 presents a flow chart illustrating an embodiment of a process which drives different values in place of masked data bits. During this process, the system first examines a DM signal to determine whether a DM signal is asserted, which indicates that a set of data bits is to be masked during a write operation (operation 502). If so, the system drives different values in place of the masked set of data bits during the write operation (operation 504).

Performance Results

Figure 6:
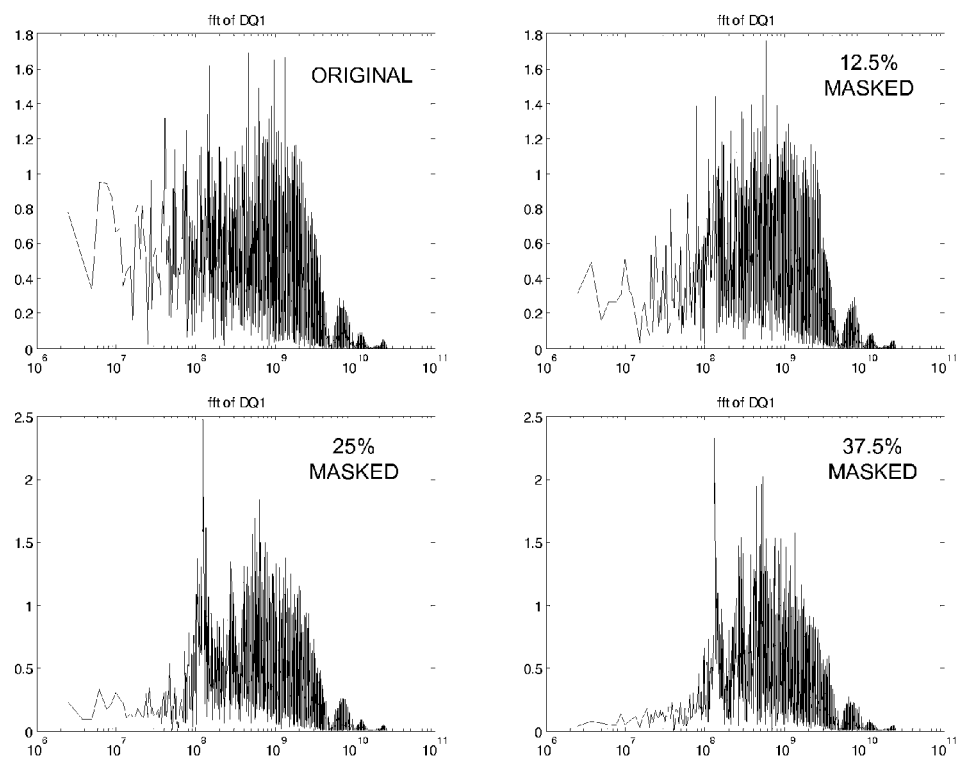
FIG. 6 presents performance results illustrating the effectiveness of the technique in reducing SSO noise.

FIG. 6 presents graphs illustrating simulated performance results, which indicate the effectiveness of the technique in reducing switching noise. These graphs present a plot of the switching noise in the frequency domain after a Fast Fourier Transform (FFT) has been applied to the switching noise. These graphs were produced by performing a simulation across 32 bits and in a system which considers an array of the three most recently transmitted DQ words.

Referring to FIG. 6, the original switching noise appears in the upper-left-hand graph, while the remaining graphs illustrate the simulated switching noise when 12.5%, 25% and 37.5% of the data signals are masked, respectively. As can be seen from these graphs, the low- and mid-frequency components of the switching noise can be dramatically reduced using this technique. As mentioned above, reducing these components can greatly reduce power-network resonance problems.

Extensions

Note that the above-described techniques only operate if there are masked bits to manipulate. However, in some situations it may not be possible to guarantee that a sufficient number of masked bits will occur to enable the system to guarantee that SSO noise is limited to a desired worst-case threshold. If there are an insufficient number of masked bits in a sequence of write operations, it is possible to break up a single write operation into multiple write operations by selectively masking different bytes of the write data. These artificially generated masked bytes can then be manipulated to achieve a desired worst-case SSO noise threshold.

Figure 7:
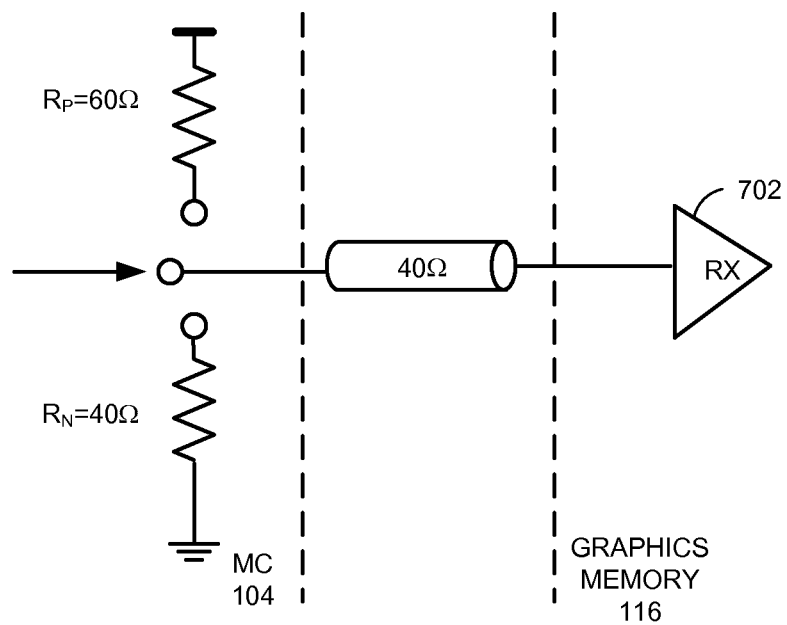
FIG. 7 illustrates an unterminated receiver.

Furthermore, although the above-described embodiments have been described with reference to a graphics system having GDDR-type terminations, other embodiments can use different types of terminations, as long as it is possible to save power or reduce SSO noise by manipulating the masked data bits. For example, FIG. 7 illustrates an embodiment in which a receiver 702 at graphics memory 116 is unterminated. As mentioned above, in this type of unterminated receiver we can drive the previous bit in place of masked bits to reduce power consumption because these unterminated data lines consume the most power during switching.

Note that the preceding embodiments may have fewer components or additional components, or fewer operations or additional operations. Moreover, two or more components or operations can be combined into a single component or operation, and/or the position of one or more components or operations can be changed. In some embodiments, at least a subset of the components or operations may be implemented on the same or different integrated circuits, and that these one or more integrated circuits may be included in a chip-package.

Devices and circuits described herein may be implemented using computer aided design tools available in the art, and embodied by computer-readable files containing software descriptions of such circuits. These software descriptions may be: at behavioral, register transfer, logic component, transistor and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level RTL languages like Verilog and VHDL, formats supporting geometry description languages (such as GDSII, GDSIII, GDSIV, CIF, and MEBES), and other suitable formats and languages. Moreover, data transfers of such files on machine-readable media including carrier waves may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 8:
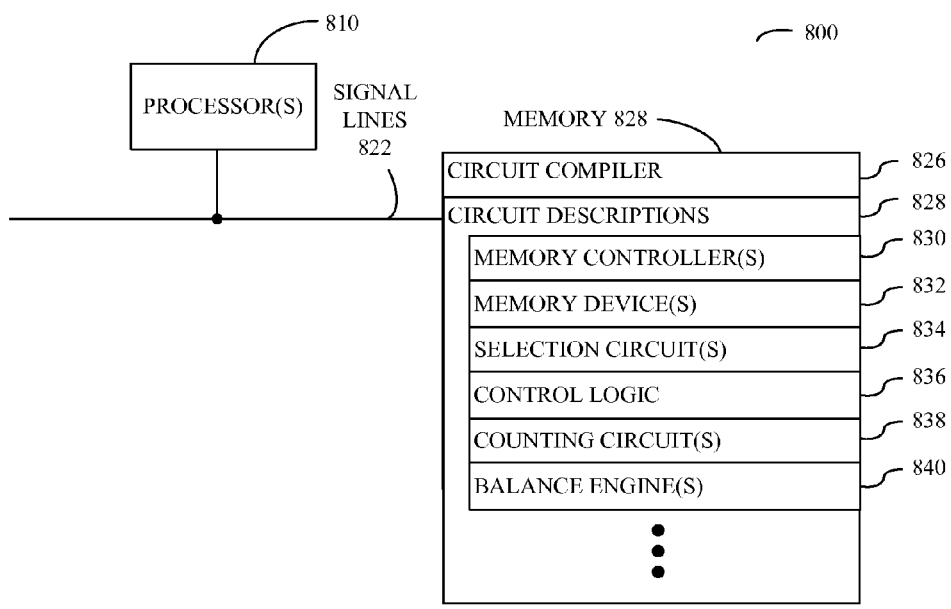
FIG. 8 presents an embodiment of a system that stores computer-readable files.

FIG. 8 presents a block diagram illustrating an embodiment of a system 800 that stores such computer-readable files. This system may include at least one data processor or central processing unit (CPU) 810, memory 824 and one or more signal lines or communication busses 822 for coupling these components to one another. Memory 824 may include high-speed random access memory and/or non-volatile memory, such as: ROM, RAM, EPROM, EEPROM, Flash, one or more smart cards, one or more magnetic disc storage devices, and/or one or more optical storage devices.

Memory 824 may store a circuit compiler 826 and circuit descriptions 828. Circuit descriptions 828 may include descriptions of the circuits, or a subset of the circuits discussed above with respect to FIGS. 2-5 and 7. In particular, circuit descriptions 828 may include circuit descriptions of: one or more memory controllers 830, one or more memory devices 832, one or more selection circuits 834, control logic 836 (or a set of instructions), one or more counting circuits 838, and/or one or more balance engines 840.

In some embodiments, system 800 includes fewer or additional components. Moreover, two or more components can be combined into a single component, and/or a position of one or more components may be changed.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims

What is claimed is:

1. A method for interfacing to a memory, comprising:
   receiving a data signal and a masked data signal;
   receiving a mask control signal identifying one or more data bits of the data signal to be masked during an access to the memory;
   generating a modified data signal, each bit of the modified data signal selected, between a corresponding bit of the data signal and a value of the masked data signal; and
   providing the modified data signal and the mask control signal to the memory during the access to the memory.

2. The method of claim 1,
   wherein the access to the memory is a write operation; and
   wherein the method is performed at a graphics controller while the graphics controller is writing a data word encoded in the modified data signal to the memory.

3. The method of claim 1, wherein providing the modified data signal to the memory results in a lower amount of power consumed while driving corresponding data lines than an amount of power that would be consumed by providing the data signal to the memory.

4. The method of claim 1, wherein
   a data line for providing the modified data signal has a Pseudo-Open-Drain-Logic (PODL) termination, and wherein the masked data signal outputted on the data line comprises a logic high voltage value.

5. The method of claim 1, wherein the masked data signal comprises values selected to limit a number of data lines that will switch logic values between a current data word of the modified data signal and a preceding data word of the modified data signal.

6. The method of claim 1, wherein the masked data signal comprises values selected to limit a change in a number of logic high values of a current data word of the modified data signal as compared to a preceding data word of the modified data signal.

7. The method of claim 1, wherein the masked data signal comprises values selected to balance according to a predetermined ratio, a total count of logic high and logic low bits in a sequence of one or more data words of the modified data signal.

8. The method of claim 1, wherein the masked data signal includes calibration information to communicate between a graphics controller and the memory.

9. The method of claim 1, wherein the masked data signal includes side-band data to communicate between a graphics controller and the memory.

10. The method of claim 1, wherein a data line for providing the modified data signal comprises an unterminated data line, and wherein a value of the masked data signal transmitted via the unterminated data line comprises a value transmitted on the unterminated data line for an immediately preceding data word.

11. A graphics controller, comprising:
    a selection circuit to receive a data signal and a masked data signal and to generate a modified data signal, the modified data signal to be driven on data lines from the graphics controller to a memory during a write operation; and
    a control input to the selection circuit, the control input to provide a mask control signal identifying one or more data bits of the data signal to be masked during the write operation;
    wherein during the write operation, the selection circuit selects the data signal for outputting as the modified data signal when the mask control signal is not asserted, and
    wherein during the write operation, the selection circuit selects the masked data signal for outputting as the modified data signal when the mask control signal is asserted; and
    a mask control signal output circuit for providing the mask control signal to the memory during the write operation.

12. The graphics controller of claim 11, wherein the providing the modified data signal to the memory results in a lower amount of power consumed while driving corresponding data lines than an amount of power that would be consumed by providing the data signal to the memory.

13. The graphics controller of claim 11, wherein a data line for providing the modified data signal has a Pseudo-Open-Drain-Logic (PODL) termination, and wherein the masked data signal outputted on the data line comprises a logic high voltage value.

14. The graphics controller of claim 11, wherein the masked data signal comprises values selected to limit a number of data lines that will switch logic values between a current data word of the modified data signal and a preceding data word of the modified data signal.

15. The graphics controller of claim 11, wherein the masked data signal comprises values selected to limit a change in a number of logic high values of a current data word of the modified data signal as compared to a preceding data word of the modified data signal.

16. The graphics controller of claim 11, wherein the masked data signal comprises values selected to balance according to a predetermined ratio, a total count of logic high and logic low bits in a sequence of one or more data words of the modified data signal.

17. The graphics controller of claim 11, wherein the masked data signal includes calibration information to communicate between the graphics controller and the memory.

18. The graphics controller of claim 11, wherein the masked data signal includes side-band data to communicate between the graphics controller and the memory.

19. The graphics controller of claim 11, further comprising:
    a logic circuit to generate the masked data signal based on one or more of the following:
    the mask control signal;
    a current data word of the data signal; and
    one or more preceding data words of the data signal.

20. The graphics controller of claim 11, wherein a data line for providing the modified data signal comprises an unterminated data line, and wherein a value of the masked data signal transmitted via the unterminated data line comprises a value transmitted on the unterminated data line for an immediately preceding data word.

21. A computer system, comprising:
a processor;
a main memory;
a graphics controller;
a memory coupled to the graphics controller;
a selection circuit within the graphics controller, the selection circuit to receive a data signal and a masked data signal and to generate a modified data signal, the modified data signal to be driven on data lines from the graphics controller to the memory during a write operation; and
a control input to the selection circuit, the control input to provide a mask control signal identifying one or more data bits of the data signal to be masked during the write operation;
wherein during the write operation, the selection circuit selects the data signal for outputting as the modified data signal when the mask control signal is not asserted, and
wherein during the write operation, the selection circuit selects the masked data signal for outputting as the modified data signal when the mask control signal is asserted; and
a mask control signal output circuit for providing the mask control signal from the graphics controller to the memory during the write operation.

22. An apparatus, comprising:
a selection circuit to receive a data signal and a masked data signal and to generate a modified data signal, the modified data signal to be driven on data lines during an access to a memory; and
a control input to the selection circuit, the control input to provide a mask control signal identifying one or more data bits of the data signal to be masked during the access to the memory;
wherein during the access, the selection circuit selects the data signal for outputting as the modified data signal when the mask control signal is not asserted, and
wherein during the access, the selection circuit selects the masked data signal for outputting as the modified data signal when the mask control signal is asserted; and
a mask control signal output circuit for providing the mask control signal to the memory during the access to the memory.

23. The apparatus of claim 22, wherein providing the modified data signal to the memory results in a lower amount of power consumed while driving corresponding data lines than an amount of power that would be consumed by providing the data signal to the memory.

24. The apparatus of claim 22, wherein the masked data signal comprises values selected to limit a number of data lines that will switch logic values between a current data word of the modified data signal and a preceding data word of the modified data signal.

25. The apparatus of claim 22, wherein the masked data signal comprises values selected to balance according to a predetermined ratio, a total count of logic high and logic low bits in a sequence of one or more data words of the modified data signal.

26. The apparatus of claim 22, wherein the masked data signal includes side-band data to communicate to the memory.

* * * * *